A. H. BELL & N. HILLS.
PRESS FOR MAKING GINGER SNAPS.

No. 189,178. Patented April 3, 1877.

WITNESSES
E. H. Bates
George E. Upshall

INVENTORS
Azel H. Bell
Norman Hills
Gilmore, Smith & Co.
ATTORNEYS.

N. PETERS, PHOTO-LITHOGRAPHER, WASHINGTON, D.C.

UNITED STATES PATENT OFFICE.

AZEL H. BELL AND NORMAN HILLS, OF BELLE PLAINE, IOWA.

IMPROVEMENT IN PRESSES FOR MAKING GINGER-SNAPS.

Specification forming part of Letters Patent No. 189,178, dated April 3, 1877; application filed February 3, 1877.

*To all whom it may concern:*

Be it known that we, AZEL H. BELL and NORMAN HILLS, of Belle Plaine, in the county of Benton and State of Iowa, have invented a new and valuable Improvement in Press for Making Ginger-Snaps; and we do hereby declare that the following is a full, clear, and exact description of the construction and operation of the same, reference being had to the annexed drawings, making a part of this specification, and to the letters and figures of reference marked thereon.

Figure 1:
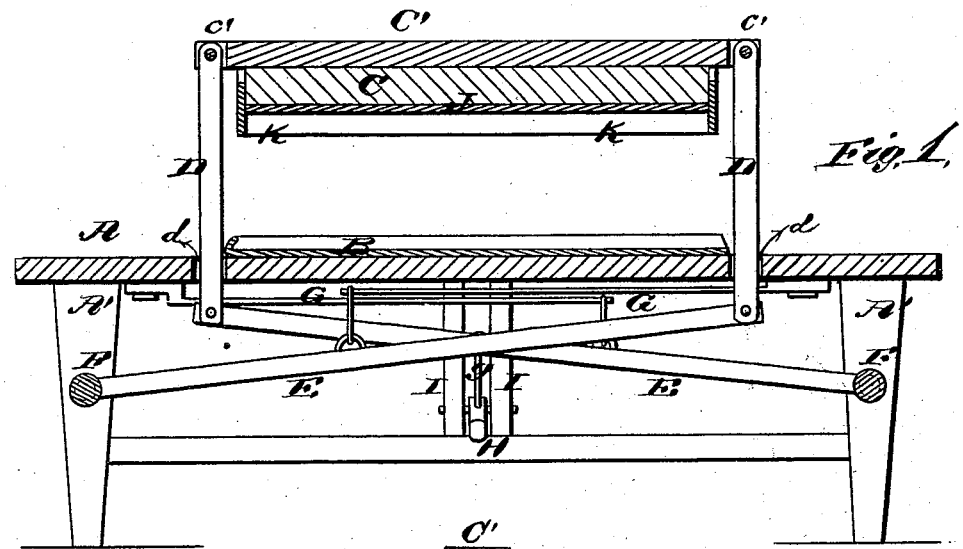
Figure 2:
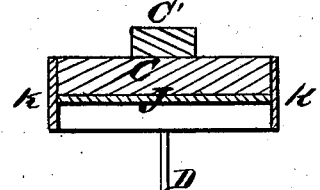
Figure 3:
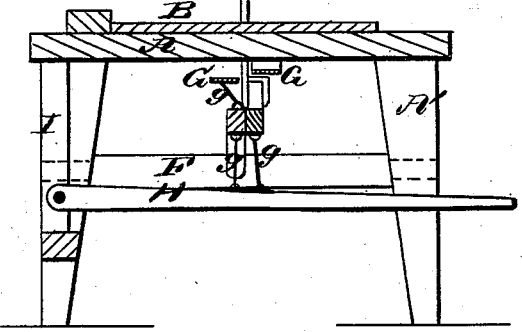
Figure 4:
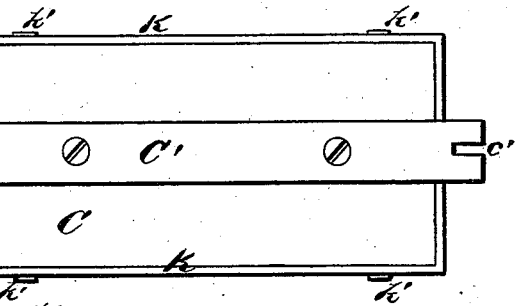

Figure 1 of the drawings is a representation of a central longitudinal section of our snap-press, and Fig. 2 is a transverse sectional view thereof. Fig. 3 is a plan view of our press, and Fig. 4 is a side view of the gage-plate.

This invention relates to that class of machines for making ginger-snaps and similar articles which employ a reciprocating follower to press the same.

The nature of said invention consists in providing the face of said follower with a flour-holding lining, in order to prevent the cakes from adhering thereto, and in providing said follower with a peripheral gage-plate, which regulates the thickness of the cakes.

In the accompanying drawing, A designates a table, on which is placed a dough-pan or metal plate, B, and C designates a follower adapted to work against said plate or pan for the purpose of pressing the cakes of dough. The top or back of said follower is provided with a rigidly-attached cross-bar, C', extending beyond the ends thereof. Said cross-bar is supported on two guiding-standards, D, that reciprocate vertically through perforations or slots $d$ in said table A. Said guide-standards D are connected by their lower ends to the inner ends of two crossed levers, E, the outer ends of which are provided with cross-shafts F, that are journaled between the legs or standards A' A', at the respective ends of table A. G G designate two springs, secured to the under side of table A, each one of said springs being linked to the top of the middle part of one of said levers E. Each lever has thus a retracting-spring. H designates a transverse treadle-lever, which is pivoted at one end between uprights I I, secured to one side of said table, and extends out far enough on the opposite side to receive conveniently the pressure of the operator's foot. Said treadle-lever H is connected to the middle parts of said levers G by links $g\ g$, (shown in Fig. 2,) so that when the operator presses on said lever H, this pressure is transmitted regularly and evenly as a downward draft to the ends of follower C, bringing the said follower down upon the cakes of dough on said plate or pan B.

It is desirable that the said cakes of dough should adhere to said pan after pressure, in order that they may be conveniently washed by a wet brush, thereby removing flour. To accomplish this we provide the face of follower C with a cover or lining, J, of felt or other material adapted to retain flour, and thereby to prevent the adhesion of said dough cakes to said follower, thus causing them to remain upon said pan B, when the action of springs G causes said follower to rise from said pan after the pressure of the operator's foot is removed.

K designates a gage plate or band, arranged around the sides and ends of follower C, and extending below the same. The sides of said gage-plate are provided with vertical slots $k$ (shown in Fig. 4) and clamping-screws $k'$, by means of which it is secured to said follower, and vertically-adjusted thereupon. This adjustment regulates the thickness of the dough cakes by varying the limit of approach of said follower to said pan B. It also holds said pan or plate B quite flat at the moment of pressure, thereby insuring even action upon said dough cakes.

This apparatus may be employed to manufacture ginger cakes or "snaps," lemon-cakes, crackers, or any similar articles pressed out of any kind of dough. The levers, springs, links, and guide-standards above described keep the reciprocating movement of said follower perfectly even.

The attachment of guide-standards D D is made pivotal at both ends, so as to allow them to move vertically without binding, and the ends of cross-bar C' are cleft for their attachment at $c'\ c'$, so as to allow a slight amount of play to the upper ends of said guide-standards.

What we claim as new, and desire to secure by Letters Patent, is—

1. In a press for making ginger-snaps and other cakes, the follower C, provided with the flour-holding facing J, in combination with the vertically-adjustable gage-plate K, substantially as described, and for the purpose set forth.

2. In a press for making ginger-snaps and other cakes, a follower, C, in combination with a vertically-adjustable gage-plate, K, substantially as and for the purpose set forth.

In testimony that we claim the above we have hereunto subscribed our names in the presence of two witnesses.

AZEL H. BELL.
NORMAN HILLS.

Witnesses:
GEORGE HUSTON,
C. C. WELLS.